(12) United States Patent
England (10) Patent No.: US 10,823,578 B1
(45) Date of Patent: Nov. 3, 2020

(54) GEOGRAPHICAL CATCHMENT DATA FOR ELECTRONIC DISPLAYS

(71) Applicant: Facebook, Inc., Menlo Park, CA (US)

(72) Inventor: Samuel Joseph England, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/003,419

(22) Filed: Jun. 8, 2018

(51) Int. Cl.
*G01C 21/36* (2006.01)
*G01C 21/34* (2006.01)
*G06F 16/9535* (2019.01)

(52) U.S. Cl.
CPC ..... *G01C 21/3617* (2013.01); *G01C 21/3484* (2013.01); *G01C 21/3679* (2013.01); *G01C 21/3688* (2013.01); *G06F 16/9535* (2019.01)

(58) Field of Classification Search
CPC ............ G01C 21/3617; G01C 21/3484; G01C 21/3688; G06F 16/9535
USPC .......................................................... 701/516
See application file for complete search history.

(56) References Cited

U.S. PATENT DOCUMENTS

| | | | | |
|---|---|---|---|---|
| 9,648,581 | B1 * | 5/2017 | Vaynblat | G06Q 30/0261 |
| 9,992,290 | B2 * | 6/2018 | Tseng | H04W 4/21 |
| 10,135,931 | B2 * | 11/2018 | Tseng | H04W 4/21 |
| 10,229,213 | B1 * | 3/2019 | Duleba | H04L 67/18 |
| 10,231,085 | B1 * | 3/2019 | Kumar | H04L 67/18 |
| 10,332,150 | B2 * | 6/2019 | Hannan | G06Q 30/0261 |
| 2013/0318077 | A1 * | 11/2013 | Greenzeiger | G06F 16/29 707/724 |
| 2017/0034289 | A1 * | 2/2017 | Theobald | H04L 67/18 |
| 2018/0173724 | A1 * | 6/2018 | Atadan | G06F 16/9537 |
| 2018/0336592 | A1 * | 11/2018 | Kurra | G06F 16/9537 |
| 2019/0213266 | A1 * | 7/2019 | Sathya | G06F 16/248 |
| 2019/0220473 | A1 * | 7/2019 | Sharifi | G06F 16/24578 |

* cited by examiner

*Primary Examiner* — Geepy Pe
*Assistant Examiner* — Tiffany P Ohman
(74) *Attorney, Agent, or Firm* — Fenwick & West LLP (57) ABSTRACT

An online system customizes content items using navigation information of users and geographical catchment areas. In an embodiments, the online system receives first sensor data indicating that a client device of a user is at a first geographical area and second sensor data indicating that the client device is at a second geographical area. The online system identifies an electronic display located at point of interest within the second geographical area and transmits navigation information to the electronic display for presentation, where the navigation information is generated based on the sensor data. The online system receives a request, from the electronic display, to provide a content item to a client device and transmits the content item to the client device.

17 Claims, 7 Drawing Sheets

| Dark Night Outfitters | | Search Locations | |
|---|---|---|---|
| Location | Store Rating | Store Manager | Store Hours |
| 1234 Gotham Ave. | ★★★★ | Barbara G. | 7 AM – 10 PM |
| 5678 Crime Alley | ★★ | Joe C. | 11 AM – 7 PM |
| 6666 Arkham Lane | ★ | Hugo S. | CLOSED |
| 0943 Wayne Plaza | ★★★★★ | Tim D. | 7 AM – 10 PM |
| 3030 Cobblepot Circle | ★★★ | Oswald C. | 11 AM – 7 PM |
| 9696 Haley St. | ★★★★ | Richard G. | 7AM – 10 PM |

Navigation Info.
Expected Profiles
Demographics
Return Customers
Comparative Insight
Competitive Insight
Conversion Rate
Catchment Data

GEOGRAPHICAL CATCHMENT DATA FOR ELECTRONIC DISPLAYS

BACKGROUND

This invention relates generally to geographical catchment areas and navigation within geographical catchment areas.

An online system typically has access to large amounts of information describing actions performed by users that may be of interest to other users of the online system. The online system allows its users to connect to and communicate with other users. Users may create user profiles on the online system that are tied to their identities and include information about the users, such as interests and demographic information. Because of the increasing popularity of these types of online systems and the increasing amount of user-specific information maintained by such online systems, an online system provides an ideal forum to increase awareness about content items to online system users. The online system further sends content items to users such as news feed stories including photos, videos, and the like.

As online systems have become more expansive, content providers have begun targeting content items towards users within the online system to cultivate interest and traffic at geographical locations associated with the content providers. For example, a content provider may provide content items describing assets available at physical locations such as brick and mortar stores. However, the content items may not be customized for a particular audience of users, for example, because users in different geographical locations may have varying interests. It is difficult for providers to determine specific content with which particular users are likely to interact.

SUMMARY

Embodiments of the invention allow an online system to generate and present navigation information to providers of the online system based on movement or location data (e.g., sensor data) of a population of users. The online system receives sensor data indicating that a client device associated with a user of the online system has moved from a first geographical area to a second geographical area (e.g., geographical catchment areas). As used herein, a geographical catchment area refers to a location where users visited, for example during a time period immediately or at some point before visiting another location. A location may include any number of points of interest and may be associated with attributes based on information about users who visit the location. The online system may determine geographic catchment areas, or modify existing geographical catchment areas, according to user navigation or other user actions.

Thus, the online system may infer navigation or location data of the user by extension of movement of the client device. Within the second geographical area, the online system identifies one or more electronic displays associated with one or more providers. An identified electronic displays may be located at a point of interest of a provider. The online system may use the location data received from a population of client devices and data provided by the provider to generate navigation information, which is transmitted to the electronic display. Upon review of the navigation information presented on the electronic display, a provider may want to customize content items to particular users who navigate to specific geographical catchment areas.

In some embodiments, the online system receives a request, from a provider, to provide one or more content items to one or more users within the online system based at least on the navigation information. The online system processes the requests and transmits the requested content items to the targeted users.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Example System Architecture

Figure 1:
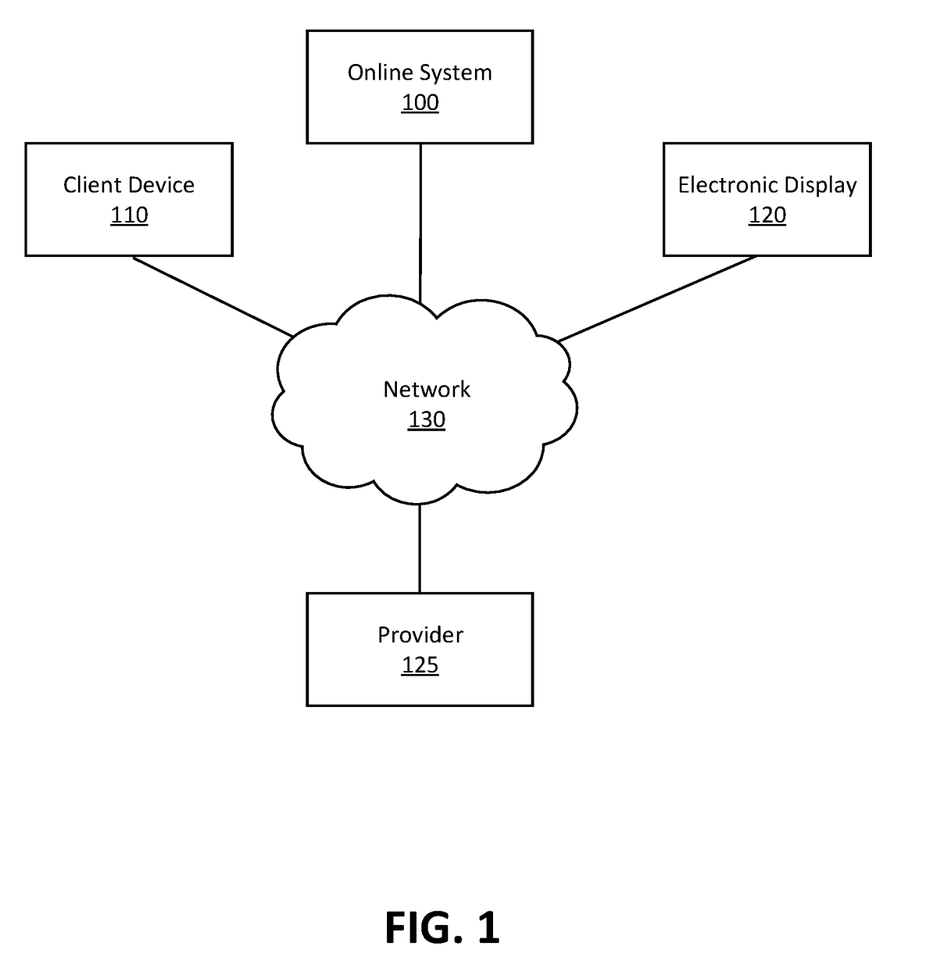
FIG. 1 is a high-level block diagram of a system environment, in accordance with an embodiment.

FIG. 1 is a high-level block diagram of a system environment for an online system, in accordance with an embodiment. The system environment shown by FIG. 1 comprises the online system 100, client device 110, electronic display 120, and provider 125 connected to each other over the network 130 (e.g., the Internet). In alternate configurations, different and/or additional components may be included in the system environment. For example, the online system 100 may be a social networking system, a content sharing network, or another system providing content to users. Additionally, the system environment may include any number of client devices 110, electronic displays 120, and providers 125.

The client device 110 and electronic display 120 are computing devices capable of receiving user input as well as transmitting and/or receiving data via the network 130, collectively referred to as client devices 110. In one embodiment, a client device 110 is a conventional computer system, such as a desktop or a laptop computer. Alternatively, a client device 110 may be a device having computer functionality, such as a personal digital assistance (PDA), a mobile telephone, a smartphone, or another suitable device. In one embodiment, a client device 110 executes an application (e.g., a web browser) allowing a user of the client device 110 to interact with the online system 100. In another embodiment, a client device 110 interacts with the online system 100 through an application programming interface (API) running on a native operating system of the client device 110, such as IOS® or ANDROID™.

The client devices 110 are configured to communicate via the network 130, which may comprise any combination of local area and/or wide area networks, using both wired and/or wireless communication systems. The system environment of the online system 100 may include more than connected client devices 110, depending on the volume of the users with access to the online system 100.

A provider 125 may be associated with a server different than another server of the online system 100 and outside of the domain of the online system 100. Servers of providers 125 and the online system 100 may communicate over the network 130. In some embodiments, the provider 125 may be associated an entity (e.g., a content provider or third party) offering one or more assets (e.g., products, services, or information) to users of the online system 100. A provider 125 may also communicate navigation information or information describing assets available from the provider 125 to the online system 100.

The online system 100 allows providers to distribute their content to users to generate, maintain, and improve interest in their content. Users interact with the content from a provider and, in response, may express interest in an off-site landing page, additional content, or a physical location (e.g., point of interest) associated with the provider. The online system 100 tracks both user activity within the online system 100 and location data gathered from a client device 110 of a user. Using this information, the online system 100 may allow the providers to more efficiently target their content to certain groups of users.

Figure 2:
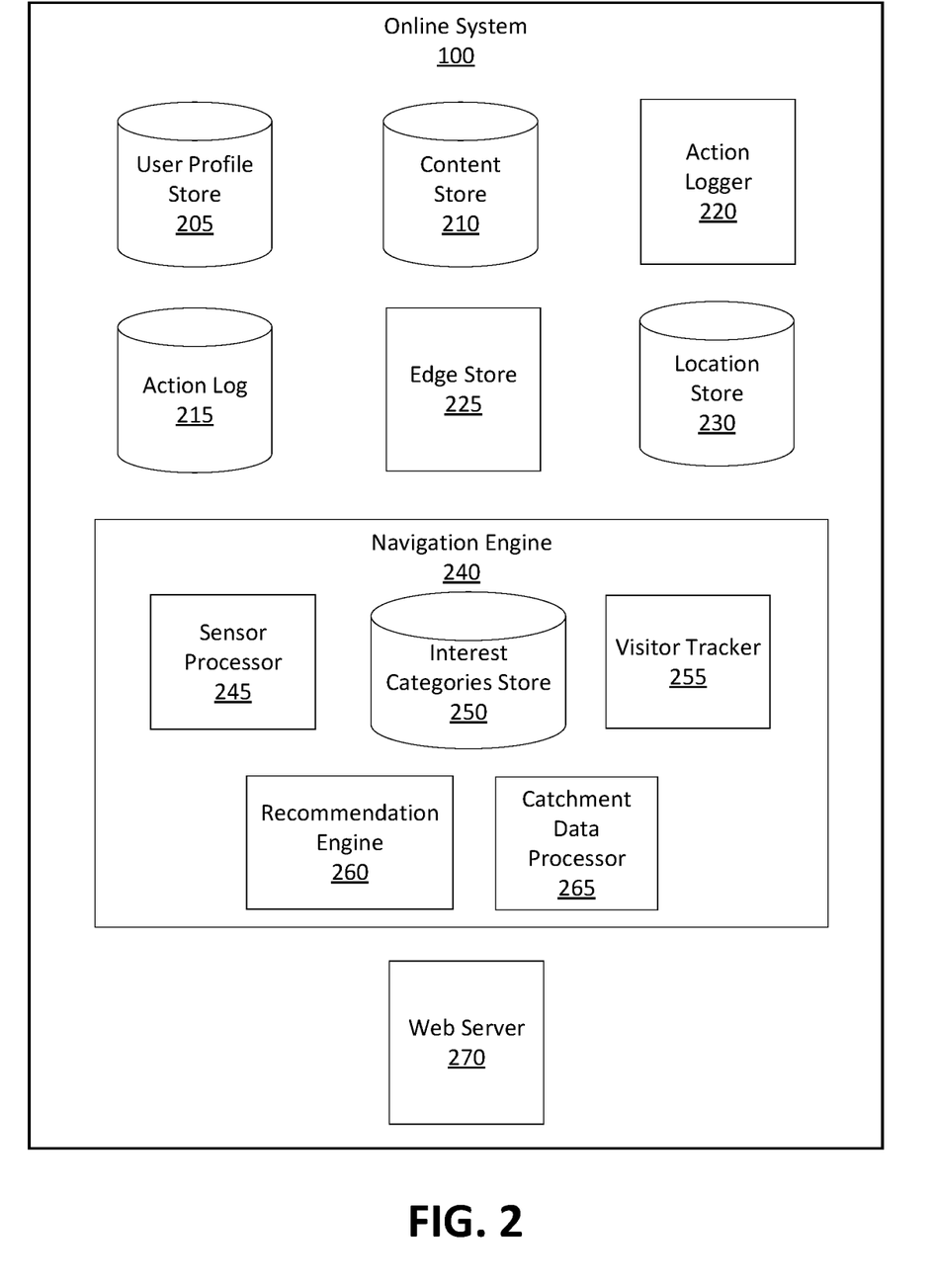
FIG. 2 is a high-level block diagram of the online system, in accordance with an embodiment.

FIG. 2 is a high-level block diagram of the online system 100, in accordance with an embodiment. As illustrated, the online system 100 includes a user profile store 205, a content store 210, an action logger 220, an action log 215, an edge store 225, a location store 230, a navigation engine 240, and a web server 270. In other embodiments, the online system 100 may include additional, fewer, or different components for various applications.

A user of the online system 100 may be associated with a user profile, which is stored in the user profile store 205. A user profile includes declarative information about the user that was explicitly shared by the user and may also include profile information inferred by the online system 100. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location, location history, assets previously acquired by the user, providers from whom those assets were acquired, and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 215.

Profiles stored within the user store 205 may also include a user-specific identification, or a user ID, for the one or more client devices 110 associated with the profile. By recording the user ID and gathering related user information, providers 125 are able to track the interests of one or more users. For example, if a particular user views a content item on the user's client device 110 and is redirected by a link in the content item to a webpage for shoes available by a provider 125, the online system 100 associates the user ID of the client device 110 with the particular user and records that the particular user is interested in the shoes.

While user profiles in the user profile store 205 are frequently associated with individuals, allowing individuals to interact with each other via the online system 100, user profiles may also be stored for providers 125. This allows providers 125 to establish a presence on the online system 100 for connecting and exchanging content with other online system users. A provider 125 may post information about itself, about its assets, or provide other information to users of the online system 100 using a brand page. Other users of the online system 100 may connect to the brand page to receive information posted to the brand page or to receive information from the brand page.

The content store 210 stores objects that each represent various types of content items. Examples of content represented by an object include a page post, a status update, a photograph, a video, a link, a shared content item, a gaming application achievement, a check-in event at a point of interest, a brand page, or other types of suitable content. Online system users may create objects stored by the content store 210, such as status updates, photos tagged by users to be associated with other objects in the online system 100, events, groups or applications.

In some embodiments, the online system 100 receives compensation from a provider 125 associated with a content item responsive to the online system 100 providing the content item for presentation to users, or responsive to users viewing, sharing, or otherwise interacting with the content item.

Additionally, a content item may include one or more targeting criteria (also referred to as "criteria") specified by the provider 125 that provided the content item (or related information) to the online system 100. A provider 125 may want to promote a particular point of interest such as a brick and mortar store to users who are likely to be interested. Thus, the provider may specify targeting criteria associated with the particular point of interest. Targeting criteria associated with a content item describing the particular point of interest may specify one or more characteristics of users eligible to be presented with the content item. For example, the online system 100 may identify users having user profile information, edges, or actions satisfying at least one of the targeting criteria. Hence, targeting criteria allow providers 125 to identify users having specific characteristics, which customizes distribution of content to different users and enables location or navigation based targeting of specific users.

In one embodiment, targeting criteria may specify actions or types of connections between a user and another user or object of the online system 100. For example, targeting criteria identifies users that have taken a particular action, such as sent a message to another user, used an application, joined a group, left a group, joined an event, generated an event description, purchased or reviewed a product or service using an online marketplace, requested information from a third party system installed an application, or performed any other suitable action. Including actions in targeting criteria allows providers 125 to further refine users eligible to be presented with content items. As another example, targeting criteria identifies users having a connection to another user or object or having a particular type of connection to another user or object. Targeting criteria for a user may be updated in response to user activity within the online system, for example the types of content that a user interacts with and the ways in which they interact with the content. For example, a user whose activity reflects an interest in a basketball team may be associated with target criteria for that team. Examples of user activity within the online system include viewing, clicking, recommending, or saving a content item such as an image article or video.

In some implementations, targeting criteria may also be assigned to providers 125 in different ways including: a manual specification by the provider 125 or based on targeting criteria associated with the interest categories assigned to provider 125. Such targeting criteria may have varying levels of specificity, for example, targeting criteria for one provider may indicate a basketball team for a specific area, whereas targeting criteria for a different provider (e.g., in the same interest category) may indicate the sport of basketball.

The action logger 220 receives communications about user actions internal to and/or external to the online system 100, populating the action log 215 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 215.

The action log 215 may be used by the online system 100 to track user actions on the online system 100, as well as actions on third party systems (e.g., associated with a provider 125) that communicate information to the online system 100. Users may interact with various objects on the online system 100, and information describing these interactions is stored in the action log 215. Examples of interactions with objects include: commenting on posts, sharing links, checking-in to physical locations via a client device 110, accessing content items, and any other suitable interactions. In some embodiments, data from the action log 215 is used to infer interests or preferences of a user, augmenting the interests included in the user's user profile and allowing a more complete understanding of user preferences. In some embodiments, an e-commerce website of a provider 125 may recognize a user of an online system 100 through a social plug-in enabling the e-commerce website to identify the user of the online system 100.

In one embodiment, the edge store 225 stores information describing connections between users and other objects on the online system 100 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 100, such as expressing interest in a page on the online system 100, sharing a link with other users of the online system 100, and commenting on posts made by other users of the online system 100. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 100, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 100 over time to approximate a user's interest in an object or in another user in the online system 100 based on the actions performed by the user. A user's affinity may be computed by the online system 100 over time to approximate the user's interest in an object, in a topic, or in another user in the online system 100 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 270 links the online system 100 via the network 130 to the one or more client devices 110, as well as to the one or more providers 125. The web server 130 serves web pages, as well as other content, such as JAVA®, FLASH®, XML and so forth. The web server 130 may receive and route messages between the online system 100 and the client device 110, for example, instant messages, queued messages (e.g., email), text messages, short message service (SMS) messages, or messages sent using any other suitable messaging technique. A user may send a request to the web server 130 to upload information (e.g., images or videos) that are stored in the content store 210. Additionally, the web server 130 may provide application programming interface (API) functionality to send data directly to native client device operating systems, such as IOS®, ANDROID™, or BlackberryOS.

The location store 230 stores tracking data describing the movement of a user through or within different locations. In some embodiments, the location store 230 stores global positioning system (GPS) tracking data of a user's movements retrieved from the client device 110 of the user. In some embodiments, locations within the location store 230 are represented as geographical catchment areas surrounded by geo-fences, which may be dynamically updated over time based on user actions. As referred to herein, a geo-fence is a representation of boundary for a geographical region within a map. A geo-fence may include any number of segments (e.g., straight or curved) that form a continuous boundary. Geo-fences may be implemented to delineate between multiple regions of a larger area, for example, states within a map of country. The online system 100 may aggregate multiple areas by aligning geo-fences to generate a larger representation, e.g., larger geo-fence and corresponding geographical area. The level of granularity associated with the location data depends on the parameters which may be manually set by the provider 125 or automatically set to default parameter values by the online system 100. For example, the location data may describe the position of a user at levels of accuracy between a latitude and longitude coordinate for a particular geographic location (e.g., a specific building or point of interest) or rather a range of latitude and longitude coordinates describing a geographical area. Points of interest (POIs) may include residential buildings, commercial buildings, and tourist attractions, among other types of POIs such as a public transit station or natural entities (e.g., body of water). In some embodiments, the location store 230 stores information associating POIs with a corresponding geographical location or geo-fence. The navigation engine 240 processes location data and generates navigation information to be presented to electronic displays 120 associated with providers 125. The navigation engine 240 includes a sensor processor 245, an interest categories store 250, a visitor tracker 255, a recommendation engine 260, and a catchment data processor 265. In other embodiments, the navigation engine 240 may include additional, fewer, or different components for various applications. Functionality described as being implemented by a particular module may be implemented by other modules.

The sensor processor 245 receives sensor data from the client device 110 of a user for determining the geographical location of the user. The sensor processor 245 may receive the sensor data periodically, at one or more predetermined times, or continuously. In some embodiments, the sensor data includes GPS data, motion data, or check-ins at physical locations. By aggregating (e.g., in sequence) the sensor data, the sensor processor 245 may generate a record of the movement of the client device 110 and thus determine navigation of the user of the client device 110. For example, the sensor processor 245 receives a first sensor data at a location A, in geographical area A, and when the user travels to a second location B, in geographical area B, the sensor processor 245 receives a second sensor data. During the receipt of sensor data, the sensor processor 245 may also record a timestamp associated with the sensor data for determining chronology of user navigation. In some embodiments, the sensor processor 245 may receive sensor data from a set of client devices representing a population of users and record the movements of every user within the population.

Analysis of the movement or navigation of a population of users allows the online system to generate navigation information to help providers 125 customize content items to users. Navigation information may describe characteristics of user navigation in the form of trends and predictions that providers 125 can use to tailor content to users of the online system 100. For example, the navigation information may suggest that, for a specific provider 125, a volume of users who visit Location A is greater than another volume of users who visit Location B, where the provider 125 has stores at both Location A and Location B. Based on the navigation information, the provider 125 may decide to close down Location B, to focus resources on Location A, to divert resources to improve Location B (e.g., to match Location A), or try to influence behavior of users visiting the stores or prospective store visitors.

In some embodiments, the interest categories store 250 stores information associated with providers 125 based on one or more interests associated with their brand. For example, the interest categories 250 may include, but are not limited to, clothing, technology, sports, music, and education. In some embodiments, a single provider 125 may be placed into multiple interest categories, for example, a provider 125 of instructional guitar manuals may be categorized under education, music, and entertainment. In some implementations, a provider 125 is not necessarily assigned to an interest category based on interests specified by the provider 125, but rather based on the interests of the users interacting with content of the provider 125 or visiting the points of interest of the provider 125. In alternate implementations, a provider 125 is initially assigned to an interest category based on specifications provided by the provider 125, but the categorization may be dynamically updated over time based on the interests of the users that associate with the provider 125.

To determine content items of interest to users, the online system 100 references the interest categories store 250 for information specific to the locations of providers 125. In some implementations, based on the assigned interest category, a point of interest may be associated with a set of default targeting criteria, to which a provider 125 may add additional criteria, as described above. For content for that point of interest to be targeted to a user, the user must satisfy one or more of these targeting criteria. For example, a criteria for a first point of interest may specify a general interest in sports whereas criteria for a second point of interest may specify an interest in a specific sports team. A user may satisfy the targeting criteria for one or more points of interest and the online system 100 would accordingly target content related to one or more points of interest at the user. In this way, the online system 100 may tailor content items to targeted users with increased specificity. In some embodiments, the online system 100 transmits navigation information to an electronic display 120 responsive to determining that a user satisfies a criteria for a point of interest based on actions performed by the user. For example, location data may indicate that the user has navigated to a second geographical area including a store of a provider 125, Bob's Shoes. The online system 100 may have previously recorded that the user is interested in basketball shoes by determining that the user viewed a content item endorsing basketball shoes. Accordingly, the online system 100 may flag Bob's Shoes as a point of interest for a provider 125 to whom navigation information of the user should be delivered. The online system 100 may send navigation information to an electronic display 120 at Bob's Shoes notifying the provider 125 that the user is a candidate for targeted content items describing basketball shoes.

The visitor tracker 255 generates characteristics of navigation information using information from the location store 230, sensor processor 245, or other components of the online system 100. The characteristics may describe trends related to the habits of a population of users. In one embodiment, the visitor tracker 255 generates a breakdown of demographic data of users visiting geographical areas associated with third-party content providers and interests in providers 250 expressed by the users. In some embodiments, the visitor tracker 255 determines trends of population of users (e.g., based on demographics) by aggregating the user ID associated with a client device 110, information describing the user associated with user ID obtained from the user profile store 205, and the location data recorded by the sensor processor 245. Demographic information may include, but is not limited to, the age, gender, ethnicity, and socioeconomic status. For example, the visitor tracker 255 may determine that users between the ages of 16 and 23 frequent Location A, located next to an arcade, more than they do Location B, located next to an elementary school. In some embodiments, the visitor tracker 255 may screen users within a proximity of a point of interest based on demographic information of those users such as age, gender, and interests. For example, if a user is age 30 and male, and the demographic information for a point of interest suggests that interested users are typically also around age 30 and male, the visitor tracker 255 may suggest that content be targeted towards the user.

In some embodiments, the visitor tracker 255 generates additional characteristics of navigation information to identify users who have visited a specific geographical area two or more times. The visitor tracker 255 receives the user ID from the user profile store 205 and retrieves a movement history of a user from the location store 230. The visitor tracker 255 identifies, based on the recorded location data, a number of times that a user has visited one or more geographical area in the movement history. In some embodiments, the visitor tracker 255 updates the movement history periodically responsive to receiving sensor data indicating that the user has visited a new geographical area. The visitor tracker 255 may categorize users of the population based on the number of times they have visited specific locations in the same geographical area.

For example, the visitor tracker 255 may compare the frequency at which a user has visited a specific location (or POI) to a threshold frequency. Responsive to determining that the user visited the specific location at least at the threshold frequency (or a threshold number of times), the visitor tracker 255 may recommend particular content items for presentation to the user. Additionally, the visitor tracker 255 may generate navigation information describing a set or population of users who frequently visited the location. For instance, the navigation information includes aggregate demographics or trends in actions performed by the set of users, which may be used by a provider 125 to customize content items targeted to users in the set. The visitor tracker 255 may deliver a list of users who have visited a specific location at least at the threshold frequency (or a threshold number of times) to an electronic display for presentation to representatives of the provider. The visitor tracker 255 may also account for the times of the day during which the users visit a given location.

In some embodiments, the visitor tracker 255 generates navigation information describing an expectation profile for a user based on the geographical areas that the user has visited, and a combination of the interests associated with the geographical area and the interests of the user. The online system receives location data indicating that client devices associated with a set of users have navigated into the geographical area associated with a point of interest. The online system accesses the user profile store 205 and identifies one or more interests associated with each of the set of users to generate a prediction of assets in which the users may be interested. In some embodiments, the visitor tracker 255 also retrieves location data previously recorded by the sensor processor 245 and stored in the location store 23 to supplement the identified interest from the user profile store 205.

In some implementations, the visitor tracker 255 correlates activity between a user and a provider within an online system or within a geographical area. Examples of activity within the online system include user acquisitions of an item by following a link within the online system associated with the provider (e.g., an advertisement, a profile page, a video, etc.), expressed interest in an item at a link associated with the provider, or expressed interest in a content item within the online system. An example of activity within a geographical area is a user traveling to a geographical location to acquire an item from a point of interest associated with the provider.

The visitor tracker 255 may aggregate such information on a user-specific basis to augment the expected profile of a user (e.g., based on the information from the user profile store 205). For example, the visitor tracker 255 may receive an indication that a user interacted with online content associated with a provider to make a first acquisition from the provider, e.g., for a basketball. The visitor tracker 255 also receives an indication that the user made a second acquisition from a point of interest associated with the provider, e.g., for a pair of basketball shoes. The visitor tracker 255 may determine interests or other attributes according to the acquisitions and store this information in a user profile of the user to further tailor future content. In particular, the visitor tracker 255 determines that the first and second acquisitions share one or more characteristics, e.g., a basketball and basketball shoes are both related to the sport of basketball. Thus, the visitor tracker 255 may infer that the user is likely interested in basketball and additional items related to this sport. Indications acquisitions may be received by the online system simultaneously or at different points in time. In some implementations, the visitor tracker 225 may determine that two or more acquisitions occurring within a certain period of time is likely to suggest a correlation between the acquired items.

The online system 100 may communicate acquisitions and user interests inferred based on the acquisitions to an electronic display for presentation, e.g., to an authorized representative of a provider. The online system may communicate information describing, e.g., the acquired items, the time when acquisitions were initiated or completed, correlations or inferences determined based on either or both acquisitions, details describing the relevant points of interest within the geographical region, or content items with which the user interacted.

In some embodiments, the navigation engine 240 determines geographical catchment areas or geo-fences using actions performed by users of the online system 100. Actions may include movement or navigation (e.g., within or between certain geographical areas or existing geo-fences), check-ins at physical locations, interacting with content items, among other types of actions. As an example, the navigation engine 240 uses navigation information from the visitor tracker 225 to determine POIs to which a population of users frequently navigated. Responsive to determining that a number of visits to one or more POIs nearby each other (e.g., within a threshold radius of distance) is greater than a threshold number (e.g., indicating high traffic or popular destinations in that area), the navigation engine 240 may generate a geo-fence around the POIs. In some embodiments, the navigation engine 240 associates the geo-fence with at least one attribute (e.g., type of POIs, rural vs. urban area, weather, population density or demographics, etc.). For instance, response to determining that the POIs include a number of stores, the navigation engine 240 determines that the geo-fence covers a commercial geographical area. As the navigation engine 240 processes new actions performed by users, the navigation engine 240 may dynamically update existing geographical catchment areas, remove geographical catchment areas, or creating new geographical catchment areas.

In some embodiments, the navigation engine 240 modifies existing geo-fences responsive to the actions performed (or not) by users. The navigation engine 240 may divide a geo-fence into two or more sub geo-fences to provide more granularity between different types of POIs within an area of the geo-fence, e.g., distinguishing between a residential and commercial area of a town. Further, the navigation engine 240 may remove or combine a geo-fence with another geo-fence responsive to determining that a frequency of visits to the geo-fence is less than a threshold frequency, e.g., within a certain period of time. In some embodiments, the navigation engine 240 dynamically updates geographical catchment areas based on real-time actions of users, e.g., an amount of time the users are spending at certain POIs. Thus, the online system 100 can determine specific audiences of users that providers 125 associated with the POIs may be interested in targeting with content items.

The recommendation engine 260 generates recommendations for providers 125 using navigation information. The recommendations may be based on trends related to specific geographical areas associated with a provider 125. In one embodiment, the recommendation engine 260 generates metrics comparing attributes of stores at different locations. For example, the online system 100 may receive information from the provider 125 indicating counts of assets acquired by users (or other actions performed by users) at different stores of a provider 125.

Additionally, the recommendation engine 260 may determine conversion rates by analyzing the navigation information for a specific geographical catchment area with visitation details from the geographical catchment area. In some embodiments, the online system 100 receives the visitation details as sensor data from the provider 125. For example, a clothing retailer has two locations A and B in a warm climate and a cold climate, respectively. The visitation details may indicate acquisitions made by users at the locations. Thus, the online system 100 can use the visitation details to determine conversion rates indicating that at Location B sells more parkas per the same amount of visitors compared to Location A. Based on the conversion rates, the recommendation engine 260 may provide suggestions regarding a more efficient allocation of resources, e.g., moving inventory of the parkas from Location A to Location B. In another embodiment, the recommendation engine 260 may also retrieve the amount of time that a client device spent at a point of interest and correlate that data with a level of interest of the user at the point of interest.

The catchment data processor 265 uses the movement data gathered from a plurality of client devices to provide further insight into the movement data at specific geographical areas. The catchment data processor 265 identifies, from the sensor processor 245, first sensor data indicating that the user has navigated to (e.g., entered) a geographical area associated with a third-party provider and retrieves second sensor data describing the preceding location of the user, herein referred to as the origin location of the user. The catchment data processor 265 identifies the origin location of multiple client devices with first sensor data at the same geographical area. By aggregating the origin locations associated with multiple client devices, the catchment data processor 265 categorizes the origin locations into origin areas of varying importance based on the volume of associated client devices at the geographical area. For example, at a Location A, the catchment data processor 265 may categorize a region within a given radius (e.g., 1, 3, or 10 miles) as being high priority based on a number of client devices originating from that region, whereas regions beyond the given radius may be categorized as lower priority. Using data describing the origin areas, the catchment data processor 265 provides insight on areas containing users to which third party providers should target their content items. In some embodiments, the priority assigned to an origin area may affect the type of content item targeted to client devices within the area as well as the volume of content items targeted to client devices within the area.

Continuing from the above example, at origin areas with a priority rating indicating that several users already visit Location A, the provider 125 targets content items describing new assets. Alternatively, at origin areas with a priority rating indicating that most users do not already visit Location A, the provider 125 targets content items providing information describing Location A or content items describing current promotions at Location A. In some implementations, the catchment data processor 265 in conjunction with the visitor tracker 255 generates navigation information relating the activity of users within points of interest and the online system with the distance between their origin location and the point of interest. Doing so allows the navigation engine 240 to generate navigation information describing useful trends and insight in terms of user proximity to a point of interest.

Example Process Flow

Figure 3:
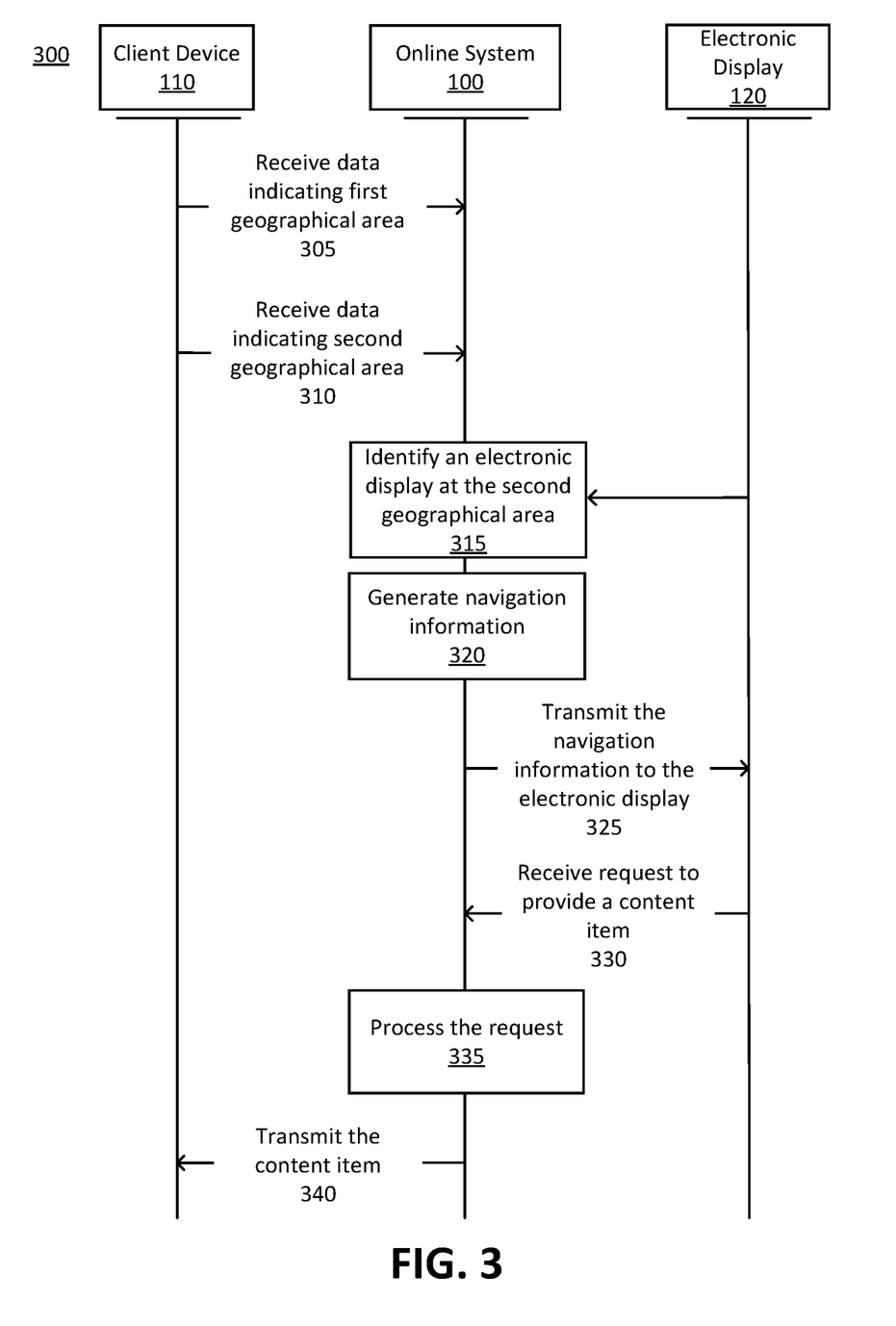
FIG. 3 is a sequence diagram of a process for providing content items using navigation information, in accordance with an embodiment.

FIG. 3 is an interaction diagram of the process 300 for generation navigation information, in accordance with one embodiment. The online system 100 receives 305 location data indicating a first geographical area of a client device 110 of a user defined within a first geo-fence. In some embodiments, the first geographical area may be the user's home or an intermediate point before reaching a destination location. In embodiments in which the first geographical area includes a residence associated with a client device, the online system recognizes the first geographical area as the origin location. The origin location may be implemented in the generation of catchment data by the catchment data processor 265 described above. The online system 100 receives 310 location data indicating a second geographical area of the client device 110, e.g., because the user has navigated with the client device 110 from the first geographical area to the second geographical area. In some embodiments, the first or second geographical areas may be included as part of a geographical catchment area. The second geographical region is located within a second geo-fence different from the first geo-fence. The second geo-fence may be adjacent to the first geo-fence or the two may be separated by one or more other geo-fenced areas. Moreover, geo-fences (or geographical regions within geo-fences) may overlap at least a portion of each other. Responsive to determining that the location data received from a client device 110 indicates that the client device 110 crossed over a geo-fence from one geographical area to another, the visitor tracker 225 may record updated location data or navigation information of the client device 110 or user in the location store 230.

The online system 100 receives navigation information from the interest categories store 250, the visitor tracker 255, the recommendation engine 260, and the catchment data processor 265 to generate navigation information for presentation to a provider. Navigation information may describe, e.g., the interests of a provider, the interests of the users aligned with the stores, the activity of users both within physical points of interest and the online system related to the providers, and various trends based on data from those users. The navigation information includes the location and user ID associated with an authorized electronic display 120 at a point of interest within the second geographical area, which is then identified 315 by the online system 100. The electronic display 120, as described above in reference to FIG. 1, is used to present navigation information generated 320 by the visitor tracker 255, the recommendation engine 260, and the catchment data processor 265. The online system 100 transmits 325 the navigation information to the electronic display 120 for review by the authorized personnel on behalf of the provider 125. Example user interfaces for presenting navigation information is described below in reference to FIG. 4A-D.

Based on the presented navigation information, the providers 125 send, by the electronic display 120, requests to provide content items to specific users or groups of users within the online system 100 which are received 330 by the online system 100. As described above, the requests are intended to improve the relevance of the content items to users within the online system 100 and the likelihood that users will interact with the content items. For example, a content item associated with an invitation or incentive to visit the second geographical area is more relevant to a user who rarely visits the second geographical area. Additionally, a content item associated with a specific, new attraction is more relevant to a user who rarely visits the second geographical location. A content item of greater relevance is more likely to be interacted with by a user of the online system. The online system 100 processes 335 the request and identifies both the targeted user and the requested content item and transmits 340 the content item to the client device 110.

Example User Interfaces Presenting Navigation Information

Figure 4A:
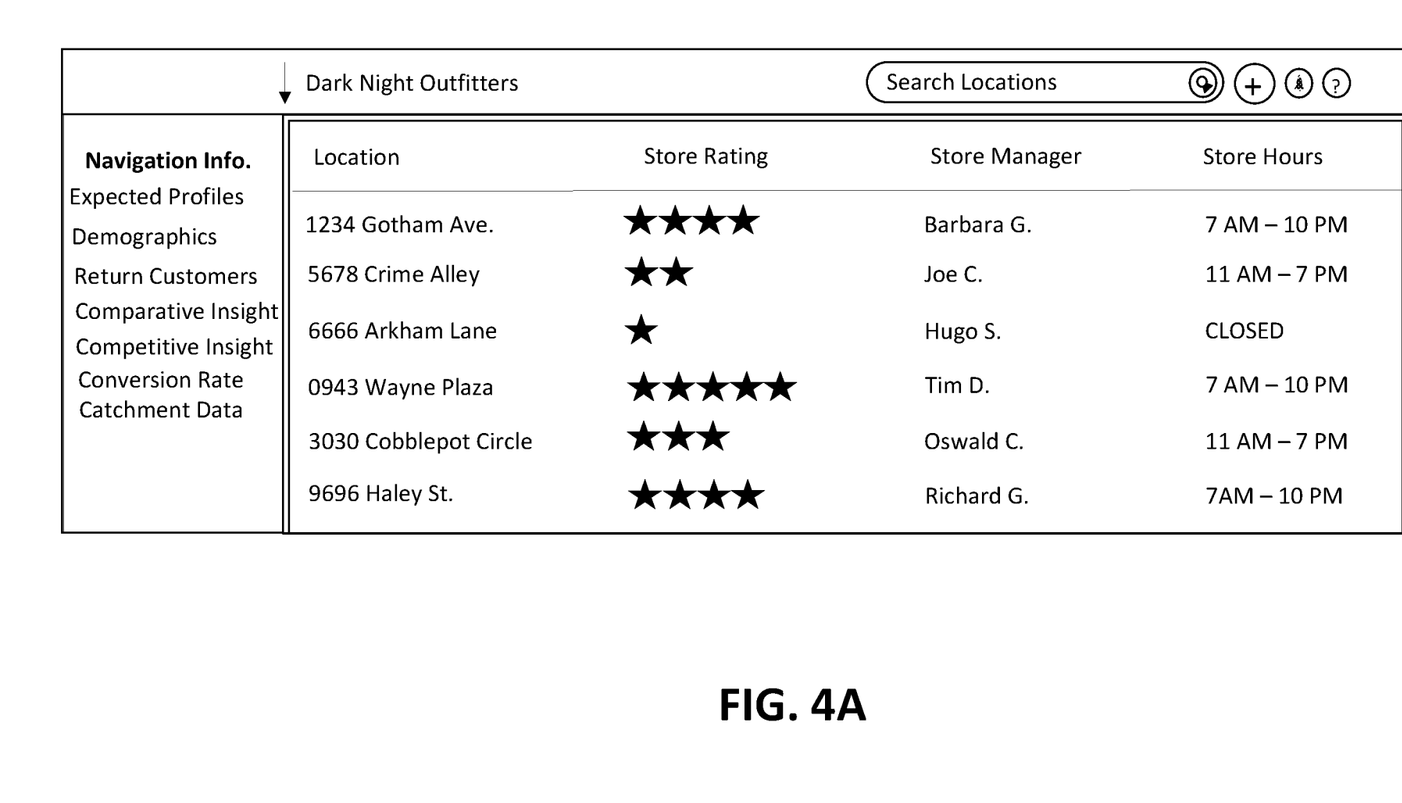
FIG. 4A includes a visual menu of locations associated with a provider, according to an embodiment.

FIG. 4A-D are user interface diagrams of a dashboard presenting the navigation information via an electronic display 120 to a provider. FIG. 4A includes a visual menu of locations associated with a provider 125 (e.g., Dark Knight Outfitters), according to an embodiment. The electronic display 120 generates a display detailing navigation information specific to a given location responsive to a selection of the given location. The user interface shown in FIG. 4A includes various options for navigation information generated by the visitor tracker 255, the recommendation engine 260, and the catchment data processor 265, which are listed as tabs adjacent to the menu of locations, for example, expected profiles, demographics, returning customers, comparative insights, competitive insights, conversion rates, and catchment data. For instance, a competitive insight may indicate metrics of a POI in comparison to aggregated and/or anonymized metrics of similar POIs. The metrics may serve as a benchmark and may be normalized based on attributes of a certain geographical region or catchment area (e.g., acquisitions of an asset per user in the nearby population). The electronic display 120 may modify the user interface to adjust a timeframe of the data presented either by expanding or reducing the period of time.

Figure 4B:
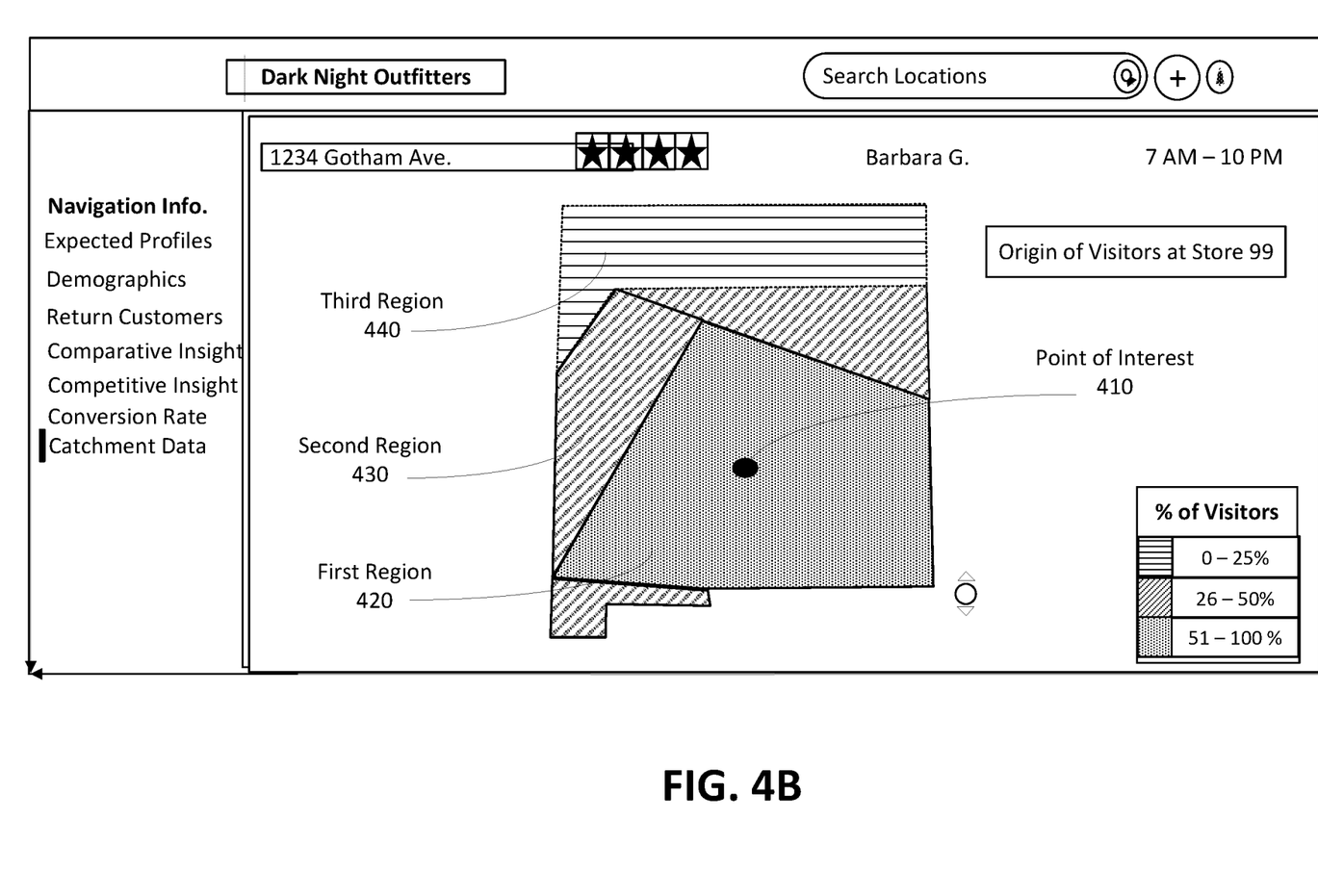
FIG. 4B illustrates an example catchment data display for a selected point of interest, according to an embodiment.

FIG. 4B illustrates an example catchment data display for a selected point of interest, according to an embodiment. For example, responsive to the electronic display 120 receiving a selection from a user for a point of interest at "1234 Gotham Ave." and a selection of the "catchment data" menu option, the online system 100 may provide navigation information for presentation in a catchment data display on the electronic display 120. The catchment data processor 265 may use the catchment data to assign priorities to regions surrounding the point of interest 410 or the second geographical area which affect the kinds of content items targeted towards them.

In the illustrated example, a first geographical catchment area 420 surrounding the point of interest 410 accounts for the majority of users frequenting the location, for example, 51-100% of a total number of visitors. Beyond the first region 420, the second region 430 accounts for fewer users frequenting the location relative to the first region, for example, 26-50% of the total number of visitors. Beyond the second region 430, the third region 440 accounts for fewer users frequenting the location relative to the first and second regions, for example, 0-25% of the total number of visitors. Each of the identified regions encompass a fraction of origin locations associated with client devices 110 detected within the geographical area including the point of interest. In some embodiments, the online system 100 provides a representation of the catchment data is interactive on the electronic display 120. Responsive to user input, the online system 100 may provide navigation information to the electronic display 120 to present additional information specific to each region, for example, further breakdowns of the volume of users based on more specific location. In some embodiments, the navigation information may indicate real-time foot traffic of users and trends of user navigation, in addition to visitor counts. The trends may indicate that certain POIs are more frequently visited during certain times of the day. The navigation information may also indicate counts of users who revisited a certain POI or a number of revisits by a given user.

Figure 4C:
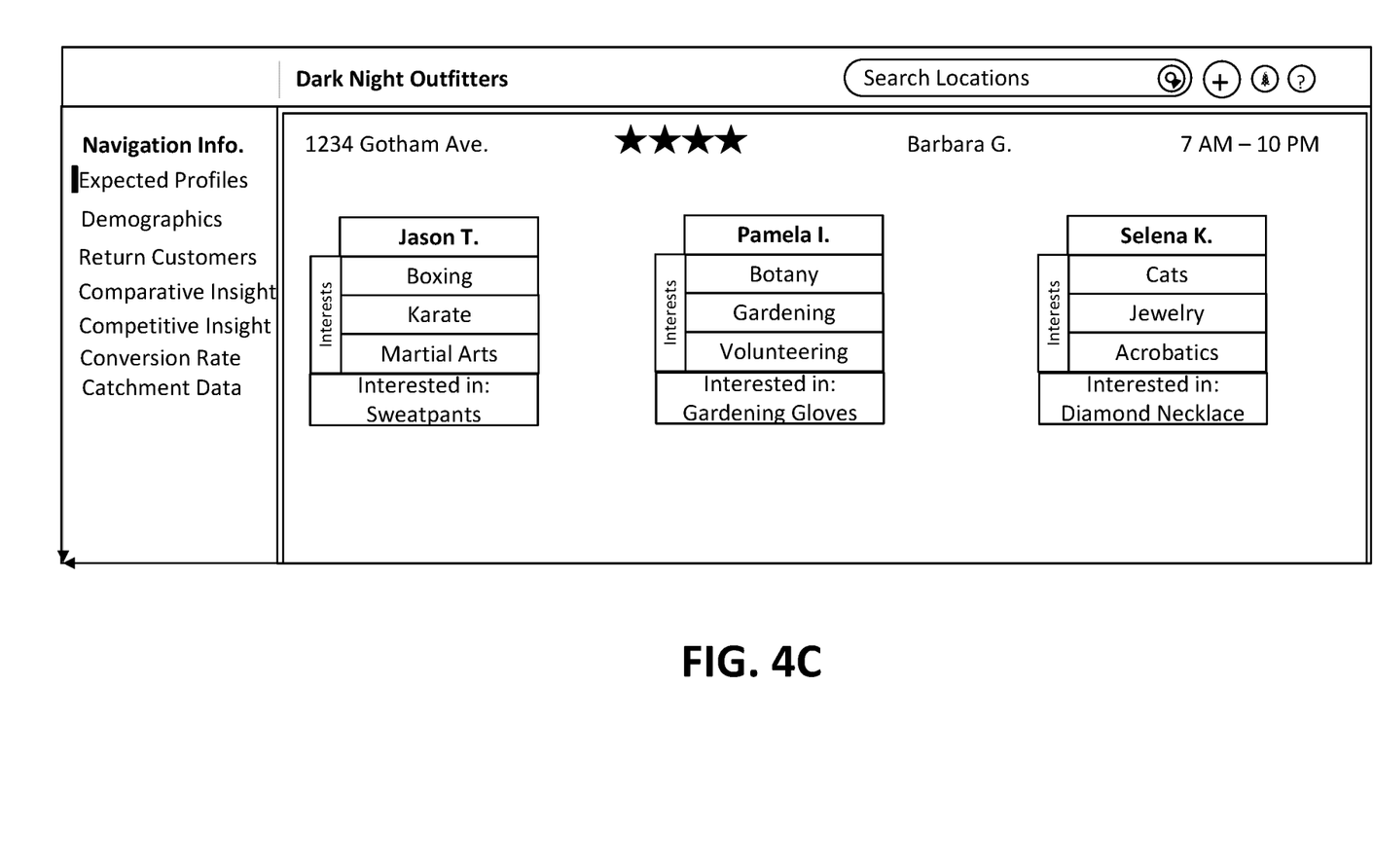
FIG. 4C illustrates an example display of a selected location of a provider, according to an embodiment.

FIG. 4C illustrates an example display of a selected location of a provider, according to an embodiment. The display includes "Expected Profiles" information for the point of interest at "1234 Gotham Ave." The recommendation engine 260 may use the characteristics of the navigation information and use profile information to predictively identify assets that may be of interest to a user. The illustrated example describes a user, Jason T., whose interests include boxing, karate, and martial arts. Based on those interests and the assets available at the provider 125, Dark Night Outfitters, the online system 100 generates a recommendation that the provider 125 should target assets related to sweatpants to Jason T. Comparatively, another user, Pamela I., is interested in botany, gardening, and volunteering. Based on these interests, the online system 100 generates a recommendation that the online system 100 targets content items related to gardening gloves to Pamela I. In some implementations, the recommendation engine 260 may rank multiple assets associated with a provider 125 and select the highest ranked item for recommendation by the electronic display 120. Additionally, responsive to user interaction with the electronic display 120, an authorized user may view and adjust the rankings at their discretion.

Figure 4D:
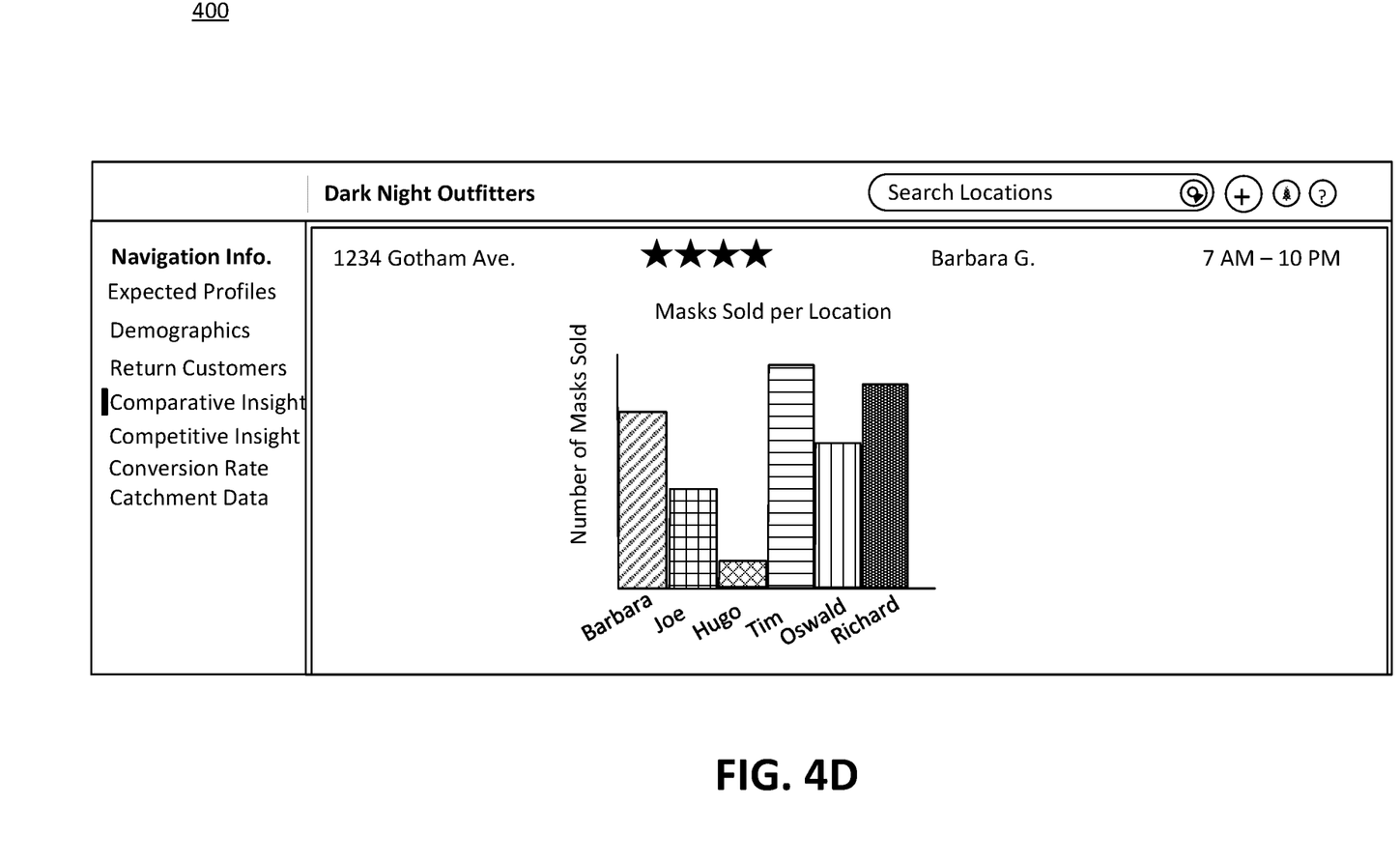
FIG. 4D illustrates an example display for a selected location of a provider, according to an embodiment.

FIG. 4D illustrates an example display for a selected location of a provider, according to an embodiment. The display includes "Comparative Insight" information for the point of interest at "1234 Gotham Ave." The recommendation engine 260 receives information from the provider 125 describing the activity of specific points of interest and user activity information from the visitor tracker 225 to generate a comparative analysis of multiple points of interest for the same provider. The illustrated example presents data comparing the sales of a specific item, a mask, across several locations. Per the locations shown in FIG. 4D, Tim's location sold the most of a certain kind of mask and Richard's location sold the second most while Hugo's location sold the fewest.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
    receiving, from a client device of each user of a first plurality of users of an online system, first sensor data recorded at a first timestamp, wherein the first sensor data recorded by the client device identifies a first geographical area of a plurality of first geographical areas in which the user of the client device is located at the first timestamp;
    receiving, from the client device of each user of a subset of users of the first plurality of users, second sensor data recorded at a second timestamp, the second sensor data identifying a second geographical area of the client device at the second timestamp subsequent to the first timestamp, wherein the second geographical area is different from each first geographical area of the plurality of first geographical areas and a point of interest associated with a content provider is located within the second geographical area;
    determining, based on the second sensor data and the first sensor data received from the client device of each user of the subset of users of the first plurality of users located in the second geographical region, a volume of users of the first plurality of users moving to the second geographical area from each first geographical area of the plurality of first geographical areas;
    transmitting navigation information to an electronic display located at the point of interest for display to the content provider, wherein the electronic display generates a user interface comprising the navigation information describing at least one priority first geographical region and movement of each user of the subset of users of the first plurality of users from a first geographical area of the plurality of first geographical areas to the second geographical area, a recommended ranking of content items to be presented to users in the at least one priority first geographical region, and at least one option for the content provider to adjust the recommended ranking of content items based on users in the at least one priority first geographical region, wherein the at least one priority geographical region represents a first geographical region with a largest number of users of the subset of the first plurality of users moving to the second geographical region;
    responsive to transmitting the navigation information, receiving, from the electronic display, a request to provide a content item of the recommended ranking to client devices of each user of a second plurality of users, wherein the second plurality of users are located in the at least one priority first geographical region at a third timestamp subsequent to the second timestamp; and
    transmitting, at the third timestamp, the content item to the client devices of users of the second plurality of users.

2. The method of claim 1, further comprising:
for each point of interest of a plurality of points of interest, determining movement of users within the point of interest based on sensor data received from client devices of the users within the point of interest; and
    determining a geo-fence of the second geographical area comprising the point of interest using the movement of the users within the point of interest.

3. The method of claim 1, further comprising:
determining actions performed by each user of the subset of users of the first plurality of users of the online system; and
transmitting navigation information to the electronic display is response to determining that each user of the subset of users of the first plurality of users satisfies a criteria for the point of interest based on the determined actions performed by each user.

4. The method of claim 3, further comprising:
determining, for each user of the subset of users of the first plurality of users, that the user completed a first acquisition as one of the actions performed on the online system;
determining that the user completed a second acquisition at the point of interest; and
transmitting user information to the electronic display, the user information determined based on at least the first and second acquisitions, the criteria of the point of interest based on acquisitions performed by users.

5. The method of claim 3, further comprising:
determining, for each user of the subset of users of the first plurality of users, one or more interests of the user according to the determined actions;
determining a category of interest of the point of interest; and
determining that the user satisfies the criteria for the point of interest by determining that the one or more interests of the user match the category of interest of the point of interest.

6. The method of claim 5, further comprising:
determining, for each user of the subset of users of the first plurality of users, that the user previously visited at least one point of interest; and
determining a type of each point of interest previously visted by the user, wherein the one or more interests of the user are determined according to the type.

7. The method of claim 3, further comprising:
determining a set of demographic information of the subset of the first plurality of users who visited the point of interest; and
determining that each user of the subset of users of the first plurality of users satisfies the criteria for the point of interest by determining that demographic information of the user matches the set of demographic information.

8. The method of claim 1, further comprising:
generating the navigation information at least by determining a number of visits to the point of interest by each user of the subset of users of the first plurality of users; and
presenting, by the electronic display, information describing users of the subset of the first plurality of users who visited the point of interest at least a threshold number of times based on the navigation information.

9. The method of claim 1, further comprising:
generating the navigation information at least by determining an amount of time spent by each user of the subset of users of the first plurality of users at the second geographical area and actions performed by each user of the subset of users of the first plurality of users at the second geographical area.

10. A non-transitory computer readable storage medium storing instructions for a method encoded thereon that, when executed by a processor, cause the processor to perform steps comprising:
receiving, from a client device of each user of a first plurality of users of an online system, first sensor data recorded at a first timestamp, wherein the first sensor data recorded by the client device identifies a first geographical area of a plurality of first geographical areas in which the user of the client device is located at the first timestamp;
receiving, from the client device of each user of a subset of users of the first plurality of users, second sensor data recorded at a second timestamp, the second sensor data identifying a second geographical area of the client device at the second timestamp subsequent to the first timestamp, wherein the second geographical area is different from each first geographical area of the plurality of first geographical areas and a point of interest associated with a content provider is located within the second geographical area;
determining, based on the second sensor data and the first sensor data received from the client device of each user of the subset of users of the first plurality of users located in the second geographical region, a volume of users of the first plurality of users moving to the second geographical area from each first geographical area of the plurality of first geographical areas;
transmitting navigation information to an electronic display located at the point of interest for display to the content provider, wherein the electronic display generates a user interface comprising the navigation information describing at least one priority first geographical region and movement of each user of the subset of users of the first plurality of users from a first geographical area of the plurality of first geographical areas to the second geographical area, a recommended ranking of content items to be presented to users in the at least one priority first geographical region, and at least one option for the content provider to adjust the recommended ranking of content items based on users in the at least one priority first geographical region, wherein the at least one priority geographical region represents a first geographical region of the plurality of first geographical regions with a largest number of users of the subset of the first plurality of users moving to the second geographical region;
responsive to transmitting the navigation information, receiving, from the electronic display, a request to provide a content item of the recommended ranking to client devices of each user of a second plurality of users, wherein the second plurality of users are located in the at least one priority first geographical region at a third timestamp subsequent to the second timestamp; and
transmitting, at the third timestamp, the content item to the client devices of users of the second plurality of users.

11. The computer readable storage medium of claim 10, wherein the steps further comprise:
for each point of interest of a plurality of points of interest, determining movement of users of the subset of the first plurality of users within the point of interest based on sensor data received from client devices of the users within the point of interest; and
determining a geo-fence of the second geographical area comprising the point of interest using the movement of the users within the point of interest.

12. The computer readable storage medium of claim 10, wherein the steps further comprise:
determining, for each user of the subset of users of the first plurality of users, that the user completed a first acquisition as an action performed in the online system;
determining that the user completed a second acquisition at the point of interest; and
transmitting user information to the electronic display, the user information determined based on at least the first and second acquisitions and a criteria of the point of interest.

13. The computer readable storage medium of claim 10, wherein the steps further comprise:
determining, for each user of the subset of users of the first plurality of users, one or more interests of the user according to actions performed by the user in the online system;
determining a category of interest of the point of interest; and determining that a user satisfies a criteria for the point of interest by determining that the one or more interests of the user match the category of interest of the point of interest.

14. The computer readable storage medium of claim 12, wherein the steps further comprise:
   determining, for each user of the subset of users of the first plurality of users, that the user previously visited at least one point of interest; and
   determining a type of each point of interest previously visited by the user, wherein the one or more interests of the user are determined according to the type.

15. The computer readable storage medium of claim 10, wherein the steps further comprise:
   determining a set of demographic information of the subset of the first plurality of users who visited the point of interest; and
   determining that each user of the subset of users of the first plurality of users satisfies a criteria for the point of interest by determining that demographic information of the user matches the set of demographic information.

16. The computer readable storage medium of claim 10, wherein the steps further comprise:
   generating the navigation information at least by determining a number of visits to the point of interest by each user of the subset of users of the first plurality of users; and
   presenting, by the electronic display, information describing users of the subset of the first plurality of users who visited the point of interest at least a threshold number of times based on the navigation information.

17. The computer readable storage medium of claim 10, wherein the steps further comprise:
   generating the navigation information at least by determining an amount of time spent by each user of the subset of users of the first plurality of users at the second geographical area and actions performed by each user of the subset of users of the first plurality of users at the second geographical area.

* * * * *

UNITED STATES PATENT AND TRADEMARK OFFICE
CERTIFICATE OF CORRECTION

PATENT NO. : 10,823,578 B1  
APPLICATION NO. : 16/003419  
DATED : November 3, 2020  
INVENTOR(S) : Samuel Joseph England Page 1 of 1

It is certified that error appears in the above-identified patent and that said Letters Patent is hereby corrected as shown below:

On the Title Page

Item [57], Column 2, Line 2, delete "In an embodiments" and insert -- In one embodiment --, therefor.

In the Claims

Column 16, Claim 3, Line 55, delete "is response" and insert -- in response --, therefor.

Column 17, Claim 6, Line 18, delete "visted" and insert -- visited --, therefor.

Column 19, Claim 13, Line 1, delete "that a" and insert -- that the --, therefor.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*